Dec. 19, 1950     C. J. CARDONA     2,534,659
TRIPOD
Filed Sept. 23, 1946     2 Sheets-Sheet 1
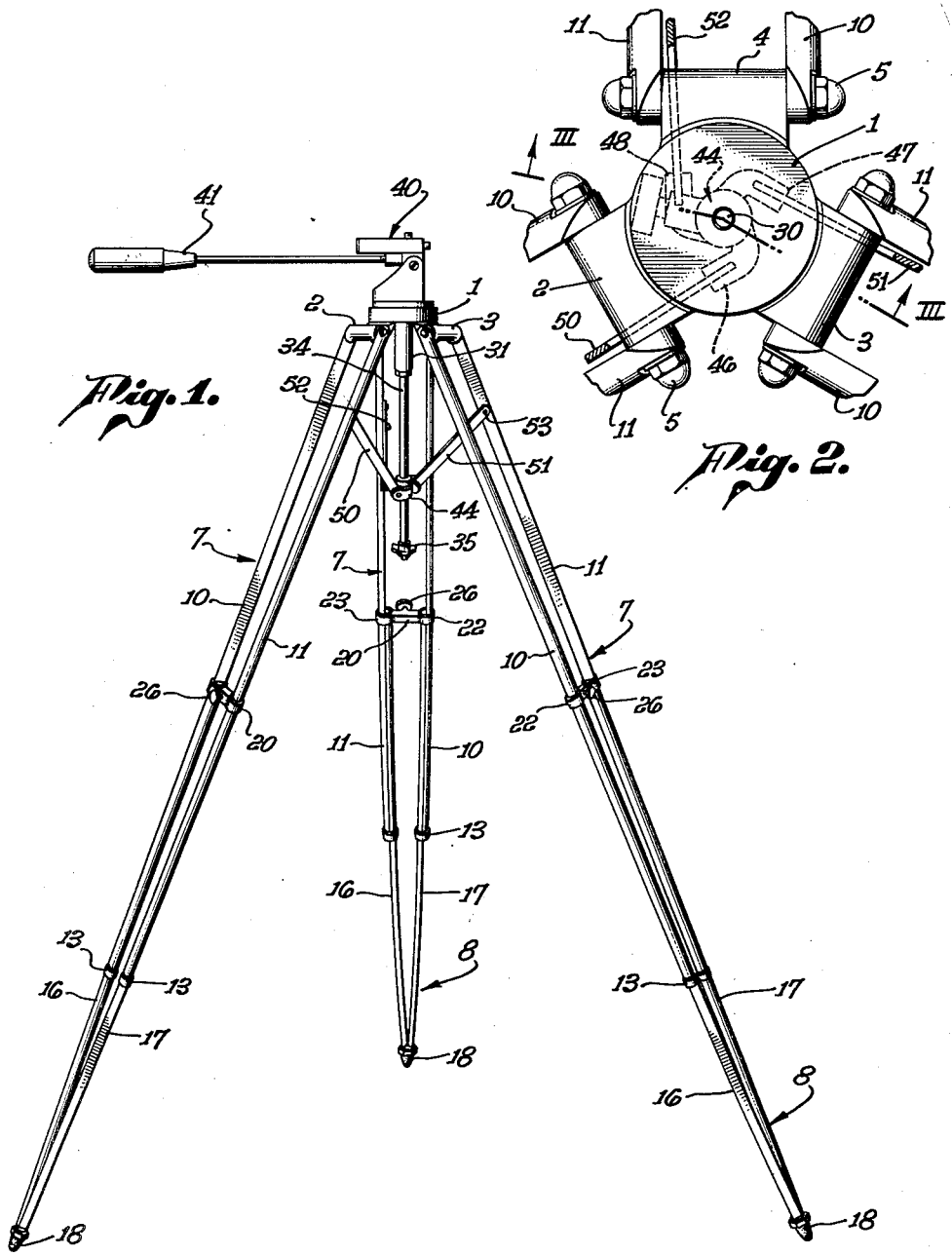
INVENTOR.
Carlos J. Cardona
BY
ATTORNEY Dec. 19, 1950 — C. J. CARDONA — 2,534,659
TRIPOD
Filed Sept. 23, 1946 — 2 Sheets-Sheet 2

INVENTOR.
Carlos J. Cardona
BY
ATTORNEY

Patented Dec. 19, 1950

2,534,659

UNITED STATES PATENT OFFICE 2,534,659

TRIPOD

Carlos J. Cardona, North Hollywood, Calif.

Application September 23, 1946, Serial No. 698,670

3 Claims. (Cl. 248—191)

This invention relates to a tripod for use with cameras, theodolites and other instruments, and is particularly directed to a lightweight, easily adjusted, stable tripod.

Tripods having legs capable of being lengthened or shortened have generally involved constructions which were cumbersome, expensive and inconvenient in use. For example, prior tripods were so arranged that the clamping screws used in adjustably holding the leg portions in extended position were carried by the lower ends of the upper part of the leg so that the operator or user had to bend in order to reach the adjusting clamp. Another disadvantage of prior tripods lay in their excessive weight and this was particularly due to the complicated structure of the various adjusting means and clamping means. Moreover, prior tripods were unstable and the angular position of each leg had to be separately adjusted and fixed with respect to the table or head. This not only required three separate tightening or clamping adjustments but it is to be noted that each of the adjustments was for the purpose of preventing a pivotal action and since the clamps were located at the pivot points, the clamping means were relatively inefficient. Furthermore, in the event a single leg of a tripod was struck an accidental blow, the tripod would readily collapse.

The present invention obviates the difficulties of prior art tripods and provides a lightweight construction in which the means for adjustably clamping each of the legs in lengthened or shortened position is readily accessible, being carried by the upper end of the lower portion of a leg so that at all times such clamp is spaced from the ground a distance equivalent to the length of such lower leg portion. In accordance with the preferred construction, a single clamp regulates the angular position of all three legs and such clamp is efficient since all stresses are directed against a stationary object and longitudinally of such object thereby obviating the difficulties previously encountered in clamping a pivot against turning movement.

It is an object of the present invention, therefore, to disclose and provide a lightweight, readily adjustable tripod of great stability.

A further object of the invention is to disclose and provide a tripod leg capable of being lengthened or shortened by adjustably positioning one leg portion with respect to another, the clamping means releasably joining the leg portions being readily accessible by the user and carried by the upper end of the lower leg portion of the tripod.

A still further object is to disclose and provide means whereby the angular relationship of all three legs may be controlled from a single, readily accessible point.

Again, an object of the invention is to provide means whereby a reinforced tripod construction is attained, accidental dislocation of one leg being prevented by an equalizing linkage.

These and other objects and advantages of the present invention will become apparent to those skilled in the art from the description given hereinafter of an exemplary form of tripod embodying the various improvements. Such exemplary form is illustrated in the appended drawings in which:

Fig. 1 is a perspective side view of a tripod with its legs extended and in position for use.

Fig. 2 is an enlarged plan view of the table, showing the pivotal connection between the legs and table.

Figure 3:
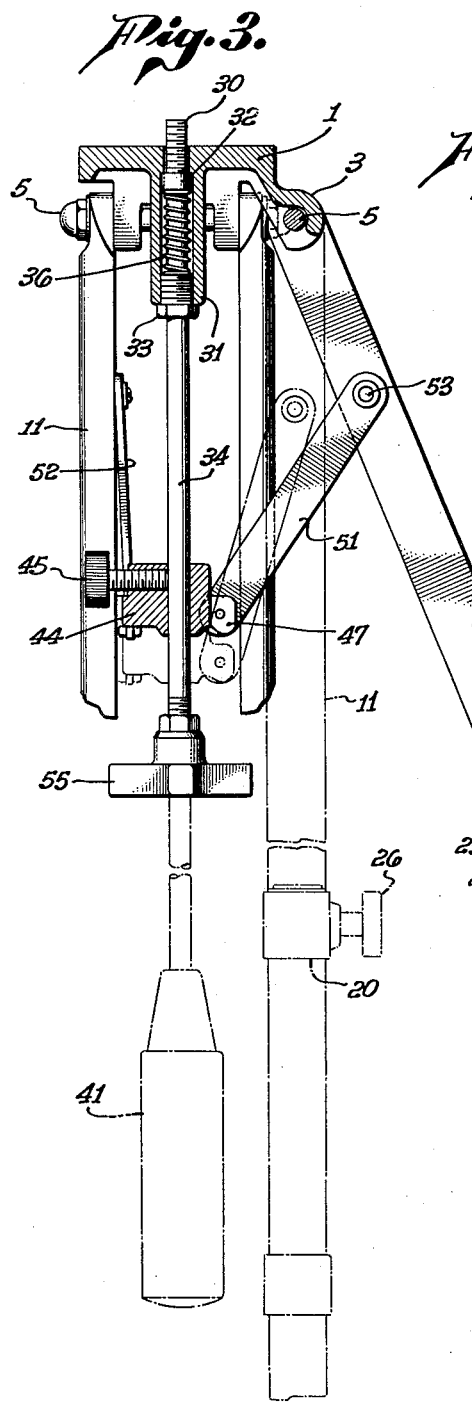
Fig. 3 is a vertical section taken along the plane III—III of Fig. 2, a collapsed position of a tripod leg being indicated in dash lines.

The exemplary embodiment illustrated in the drawings comprises a table member 1 of circular form and provided with a flat top, this member carrying three circumferentially arranged, angularly related, horizontally disposed knuckles 2, 3 and 4. These knuckles are preferably slightly below the plane of the table 1. Although these knuckles may be constructed in various ways, each of the knuckles illustrated includes end portions and an intervening, semi-cylindrical web, the end portions being bored so as to receive a pivot pin or bolt 5.

A tripod leg is pivotally attached to each of the knuckles by means of the bolt 5. In the illustrated form each leg includes an upper leg portion 7 and a lower leg assembly 8. The upper leg portion 7 preferably consists of two semi-cylindrical leg elements 10 and 11 in spaced relation with the flat sides or faces opposing each other. The upper ends of 10 and 11 are bored to receive the bolt 5 and suitable washers are interposed between the bolt heads and the leg elements 10 and 11.

A guide ring such as 12 is carried by the lower end of each leg element, such guide ring being attached as by means of the screw 14.

The lower leg assembly 8 comprises a pair of semi-cylindrical leg sections 16 and 17 joined at the bottom with the flat sides directed outwardly. Preferably the joined lower ends of leg sections 16 and 17 are formed into a cone and received within a fitting 18, such fitting carrying a lower plug of leather or other resilient material capable of supporting the weight of the camera without undue slippage.

Figure 4:
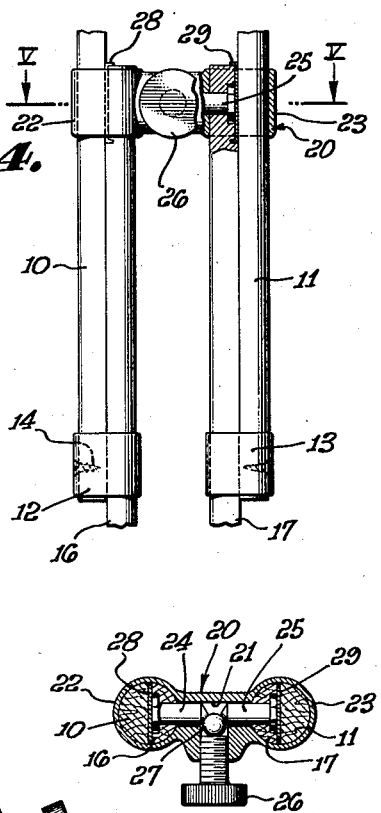
Fig. 4 is an enlarged side view of means employed in clamping the leg sections in adjusted position.

The upper ends of the leg sections 16 and 17 extend through the guide rings 12 and 13 (as best shown in Fig. 4) with the flat sides of the leg sections in sliding contact with the flat sides of leg elements 10 and 11.

A clamp fitting is carried by and connects the upper ends of leg sections 16 and 17, said fitting including adjustable means for clamping the adjacent leg elements and leg sections against relative movement.

Figure 5:
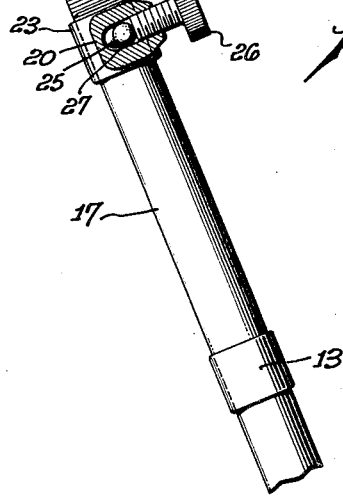
Fig. 5 is a horizontal section taken along the plane V—V in Fig. 4.

As illustrated in Figs. 3, 4 and 5, each of said clamp fittings may include a body 20 provided with a through bore 21 and a pair of integral hold rings 22 and 23 having an internal diameter slightly greater than the diameter of adjacent leg elements and sections. The clamp fitting 20 is attached to the upper ends of leg sections 16 and 17 by means of presser pins 24 and 25 (preferably provided with enlarged heads), these pins extending through transverse bores formed near the upper ends of the leg sections with the body of the pins in the bore 21. The body 20 is also provided with a transverse internally threaded bore capable of receiving the thumb screw 26.

The opposing ends of the presser pins 24 and 25 are preferably conical and the thumb screw 26 is capable of pressing a steel ball 27 against such opposing conical ends. In this manner a single adjustment of the thumb screw distributes pressure through the ball 27 onto the pins 24 and 25 and causes the enlarged heads of such pins to bear against the adjacent portions of the leg elements 10 and 11.

In order to prevent the heads from forming indentations in the flat surfaces of leg elements 10 and 11, presser plates in the form of metallic strips 28 and 29 may be interposed between the heads and the adjacent leg elements. The clamping pressure is thus uniformly applied against both of the leg elements 10 and 11, such elements being restrained by the rings 22 and 23, respectively.

It will be evident from the description given that since the fitting 20 is carried by the upper end of the lower section 8, the thumb screw 26 may be easily reached by the operator and each of the legs of the tripod adjusted to desired length without stooping.

Although each of the pivot pins or bolts 5 may be separately tightened so as to prevent other than a desired angular position of a leg with respect to the table 1, such means of tightening the legs are relatively inefficient and other means have been provided by this invention.

The table 1 is provided with a hold-down screw 30 extending through an axial bore. The table may be provided with an axial downwardly extending tubular member 31 of larger bore and the hold-down screw 30 may be provided with a girdle 32 adapted to abut the shoulder formed between the enlarged bore and upper reduced bore. A threaded, bored fitting 33 may be carried by the lower end of the extension 31 thereby permitting the shank 34 of the hold-down screw to slide through the bore of the fitting. The lower end of the shank 34 is preferably provided with a wing nut 35 attached thereto so that the entire shank 34 and hold-down screw 30 may be rotated by means of the wing nut 35. A spring 36 may bear against the girdle 32 and fitting 33 yieldably urging the hold-down screw 30 in an upward direction. Upon removal of the tripod head, the spring-held hold-down screw 33 and shank 34 permit the legs 7 to be moved into folded, substantially horizontal relation with each other against the tension of the spring 36, as clearly shown by the broken lines in Fig. 3.

Fig. 1 illustrates a tiltable, rotatable tripod head 40 mounted upon the table 1. Although any type of camera or tripod head may be carried by the tripod, the particular form of tripod head illustrated forms the subject matter of my co-pending application, Serial No. 572,329, now Patent No. 2,429,803, October 28, 1947. A handle 41 removably attached to the head is used for adjustably positioning such head, and when the tripod is in collapsed position such handle 41 may be unscrewed from the head 40 and temporarily screwed into an internally threaded bore formed in the wing nut 35 so as to permit the handle 41 to be carried as indicated in dash lines in Fig. 3.

In order to adjustably position all of the legs at equal angles to the vertical or at equal angles to the axis of the shank 34, the shank 34 is provided with a carriage 44 slidable upon the subject shank and adapted to be adjustably positioned thereon by means of set screw 45 provided with a knurled knob. This carriage 44 is provided with three angularly directed bifurcated wings as indicated at 46, 47 and 48 (Fig. 2) and a link is pivotally connected to each of such wings and to one of the leg elements of an adjacent leg. Such links are indicated at 50, 51 and 52. Each of the links is pivotally connected to an upper portion of the adjacent leg element as, for example, at 53.

When, therefore, the operator desires to set up the tripod, the carriage 44 may be adjustably positioned along the shank 34 and fastened in the selected position by means of the set screw 45. The individual legs may then be lengthened as conditions require so as to conform with the contour of the ground. Inasmuch as all three legs are interlocked with the carriage 44, any leg may be kicked or a blow accidentally imparted thereto without displacing the legs or without causing the entire tripod to collapse. It will be noted that frictional engagement between the said screw 45 and the shank 34 is directed longitudinally of the shank and no torque is imparted to the shank.

It will be understood that the tubular member 31 may extend downwardly for a considerable distance and the carriage 44 arranged to slidably move and be adjustably positioned upon such tubular member. This modified arrangement (not shown) would then permit rotation of the shank of the hold-down screw at all times.

Attention is also called to the fact that the steel ball 27 equalizes and distributes the pressure of the clamp screw 26 against the ends of pins 24 and 25 so that even though the opposing conical ends of such pins are not symmetrical with respect to the clamp screw 26, the ball 27 may move into simultaneous contact with such pins and equalize the distribution of pressure.

Various changes and modifications may be made from the specific construction illustrated. All changes coming within the scope of the appended claims are embraced thereby.

I claim:

1. A tripod including a table member having three circumferentially arranged and angularly disposed knuckles extending therefrom, a tripod leg pivotally attached to each of said knuckles, each tripod leg comprising an upper leg portion having two semi-cylindrical leg elements with their flat sides opposing each other, the upper ends of said leg elements being pivotally connected to a knuckle and a guide ring carried by the lower end of each leg element; the lower leg assembly comprising a pair of leg sections joined at the bottom, the upper ends of said leg sections being semi-cylindrical and extending through the guide rings with the flat sides of the leg sections in sliding contact with the flat sides of the leg elements; and a clamp fitting carried by and connecting the upper ends of the leg sections, said fitting including a body portion and a pair of integral hold rings, each ring encircling adjacent leg elements and leg sections; a bore through the body portion transverse to the axis of the hold rings, a presser pin extending through each leg section and into said bore; and adjustable means carried by the said body and cooperating with said presser pins for clamping adjacent leg elements and leg sections against relative movement.

2. A tripod including a table member having three circumferentially arranged and angularly disposed knuckles extending radially outwardly therefrom, and a tripod leg pivotally attached to each of said knuckles, each tripod leg comprising an upper leg portion having two semi-cylindrical leg elements with their flat sides opposing each other, the upper ends of said leg elements being pivotally connected to said knuckles and a guide ring carried by the lower end of each leg element; a lower leg assembly comprising a pair of leg sections joined at the bottom, the free end of said leg sections being semi-cylindrical and extending through the guide rings with the flat sides of the leg sections in sliding contact with the flat sides of the leg element; and a clamp fitting carried by and connecting the upper ends of the leg sections, said fitting including a pair of integral hold rings, each encircling adjacent leg elements and leg sections and manually operated means carried by said integral hold rings for clamping leg elements within the hold rings, said manually operated means including an actuable element having its axis perpendicular to a transverse line extending between the integral hold rings; and a hold-down screw carried by the table with its axis perpendicular to the top of the table, said screw including a shank extending vertically between the legs of the tripod and spring means for biasing said hold-down screw upwardly.

3. A tripod including a table member having three circumferentially arranged and angularly disposed knuckles extending radially outwardly therefrom, and a tripod leg pivotally attached to each of said knuckles, each tripod leg comprising an upper leg portion having two semi-cylindrical leg elements with their flat sides opposing each other, the upper ends of said leg elements being pivotally connected to said knuckles and a guide ring carried by the lower end of each leg element; a lower leg assembly comprising a pair of leg sections joined at the bottom, the free end of said leg sections being semi-cylindrical and extending through the guide rings with the flat sides of the leg sections in sliding contact with the flat sides of the leg element; and a clamp fitting carried by and connecting the upper ends of the leg sections, said fitting including a pair of integral hold rings, each encircling adjacent leg elements and leg sections and manually operated means carried by said integral hold rings for clamping leg elements within the hold rings and a hold-down screw carried by the table with its axis perpendicular to the top of the table, and normally projecting beyond the plane of the table when said tripod is in operative position, said screw including a shank extending vertically between the legs of the tripod, spring means for biasing said hold-down screw upwardly, a carriage selectively positionable on the shank, and diagonally upwardly directed links pivotally connecting the carriage with each leg of the tripod whereby movement of the legs into a parallel, inoperative position causes downward, axial movement of the shaft against said spring means for retracting the hold-down screw below the plane of the table.

CARLOS J. CARDONA.

REFERENCES CITED

The following references are of record in the file of this patent:

UNITED STATES PATENTS

| Number | Name | Date |
| --- | --- | --- |
| 1,426,088 | Mitchell | Aug. 15, 1922 |
| 1,495,458 | Thalhammer | May 27, 1924 |
| 2,282,285 | Olson | May 5, 1942 |
| 2,374,021 | Korling | Apr. 17, 1945 |